Sept. 8, 1936.    L. NITTEL    2,053,297
QUICK DETACHABLE OIL PAN
Filed Sept. 13, 1935
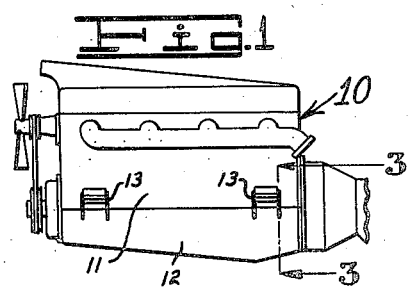
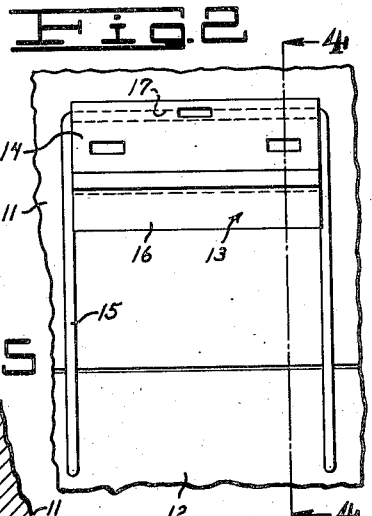
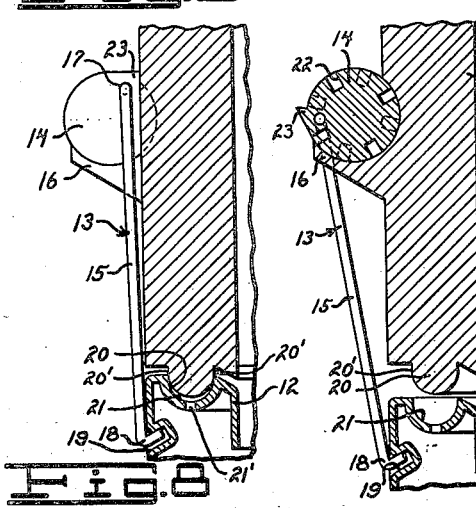
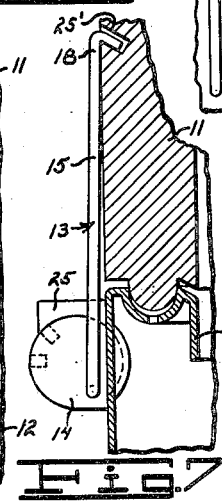
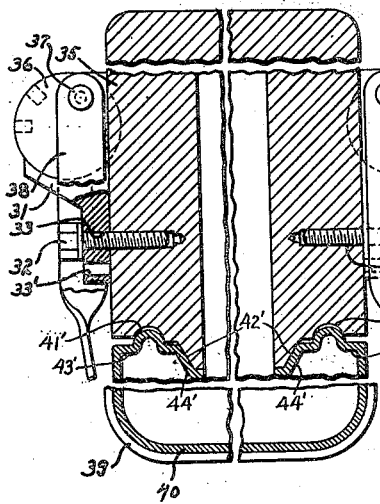
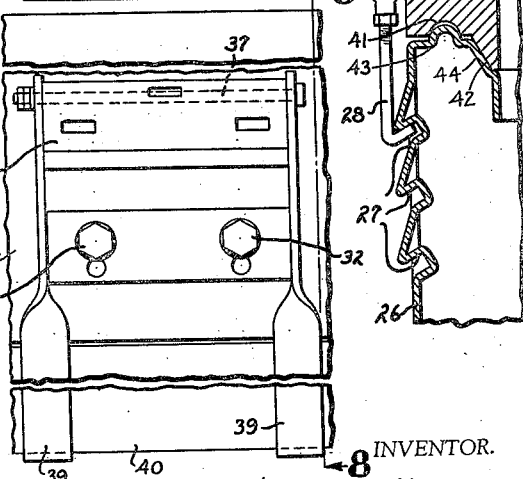
INVENTOR.
LAWRENCE NITTEL
BY
B. J. Craig
ATTORNEY.

Patented Sept. 8, 1936

2,053,297

UNITED STATES PATENT OFFICE 2,053,297

QUICK DETACHABLE OIL PAN

Lawrence Nittel, East Bakersfield, Calif.

Application September 13, 1935, Serial No. 40,433

9 Claims. (Cl. 184—106)

This invention relates to quick detachable oil pans for internal combustion motors.

The general object of the invention is to provide an improved detachable connection for holding the oil pan of the crank case of internal combustion motors in place.

Another object of my invention is to provide a crank case having an oil pan secured thereto by quick detachable connections whereby the pan may be readily removed.

Other objects and the advantages of this invention will be apparent from the following description taken in connection with the accompanying drawing, wherein:

Fig. 1 is a side elevation of an engine equipped with my improved oil pan;

Fig. 2 is a fragmentary view of my improved fastening means;

Fig. 3 is a fragmentary cross-sectional view of the fastening means taken on line 3—3 of Fig. 1;

Fig. 4 is a view similar to Fig. 3 taken on line 4—4 of Fig. 2, showing the pan slightly lowered;

Fig. 5 is a fragmentary section of a modification of my fastening devce;

Fig. 6 is a fragmentary section of a further modification of the fastening device;

Fig. 7 is a fragmentary plan view of another modification of my fastening device; and Fig. 8 is a section taken on line 8—8 of Fig. 7.

As shown by reference characters on the accompanying drawing I have indicated an internal combustion engine generally at 10. As shown the engine includes a block 11 and an oil pan 12. To secure the oil pan 12 in place I provide a plurality of fastening devices 13, each of which include a spool 14 and a bail 15. A perch member 16 which is integral with the engine block 11 is adapted to receive the spool 14. The bail 15 is mounted in an eccentric aperture 17 in the spool 14. The extremities of the bail 15 are formed into hooks 18 which are adapted to be positioned in recesses 19 in the oil pan 12.

The block 11 is provided with a tongue member 20 which is downwardly directed and which has a rounded lower edge with walls 20' which are parallel to each other just above the rounded edge. The oil pan 12 is provided with a groove 21 in its upper surface which is shaped to correspond substantially with the shape of the tongue 20, but the parts are so proportioned that as soon as the parallel walls 20' enter the groove 21 a tight fit is secured. In this manner, if wear occurs, a tight fit will be secured by moving the tongue 20 further into the groove. The groove 21 is provided with a draining aperture 21' so that if any oil collects in the groove 21 it will be forced through the aperture 21' when the parts are assembled.

When it is desired to install the oil pan 12, the latter is held in position close to the block 11, the hooks 18 of the bail 15 are inserted in the recesses 19 and the spool 14 is placed on the perch 16. (See Fig. 4.) A screw driver or other implement is then inserted in one of the slots 22 provided in the spool 14, and the spool is rotated until the bail 15 has passed beyond the axis of the spool and a lug 23 engages the block. (See Fig. 3.) When all the fastening members 13 are thus locked the oil pan is securely held in place without gaskets, although such may be used if desired.

In some installations I employ a perch 25 which is mounted on the oil pan 12. (See Fig. 5.) When this construction is used I provide apertures 25' in the block 11 in which the hooks 18 are secured.

In Fig. 6 I show a modified form of my invention in which I provide the block 11' with an oil pan 26 which has a plurality of spaced apertures 27 therein which are adapted to be engaged by a hook member 28 which is connected by a turnbuckle 29 to a bail 30. The bail 30 is positioned in the spool 14 in the same manner as the bail 15 previously described. The turnbuckle 20 affords adjustment for the hook 27.

The block 11' is shown as provided with a bottom groove 41 and with an outwardly bevelled downwardly directed inner rim 42, and the pan 40 is provided with an upwardly faced bead 43 and with a downwardly resilient skirt 44. The bead 43 fits the groove 41 and the skirt 44 resiliently engages the bevelled portion 42 so that a tight fit is secured without the use of gaskets.

In Figs. 7 and 8 I show a form of my invention which is adapted to be applied to engines not originally equipped for my device. Perches 31 are secured on the block 35 by screws 32 which pass through apertures 33 in the perches and engage threaded apertures 34 in the block. The perches 31 support spools 36 which are similar to the spools 14 previously described. A bolt 37 passes through an eccentrically positioned aperture in a spool 36. Each bolt pivotally supports the ends 38 of a pair of straps 39 which extend around and under the oil pan 40 to hold the oil pan in place. A second aperture 33' in each perch allows for adjustment of the perches.

The block 35 is shown as provided with a bottom groove 41' and an outwardly bevelled rim 42'. The pan 40 is provided with a bead 43' and a downwardly resilient skirt 44' so that a tight fit is secured as above described.

From the foregoing description it will be apparent that I have provided a novel quick detachable oil pan which is simple in construction and highly efficient in use.

Having thus described my invention I claim:

1. The combination of an internal combustion engine block and a removable oil pan, said block and oil pan having coacting grooves and tongues to prevent leakage, a plurality of bails on said block, said bails having hooks thereon, said oil pan having recesses to receive said hooks and means to tighten said bails.

2. In a fastening device adapted to secure an oil pan to a block, a perch secured to said block, a tightening member rotatively mounted on said perch and a bail adapted to engage said oil pan and eccentrically secured to said tightening member.

3. A combination of an internal combustion engine block and a removable oil pan, said block having a bead in its lower face and having a bevelled portion adjacent said bead and said pan having a grooved portion receiving said bead and having an inclined portion adjacent to said bevelled portion and means to hold said pan on said block, said groove having a draining aperture.

4. In a fastening device adapted to secure an oil pan to a block, a pair of perches secured to said block on opposite sides thereof, tightening members rotatively mounted on each of said perches, and a strap passing under said oil pan and eccentrically secured at one end to one of said tightening members.

5. In a fastening device adapted to secure an oil pan to a block, a perch secured to said block, a tightening member rotatively mounted on said perch, a bail eccentrically mounted on said tightening member, said bail having a hook at the ends thereof, said oil pan having spaced apertures therein adapted to be engaged by said hooks.

6. In a fastening device adapted to secure an oil pan to a block, a perch secured to said block, a tightening member rotatively mounted on said perch, a bail eccentrically mounted on said tightening member, said bail having a hook at the end thereof, said oil pan having an aperture adapted to be engaged by said hooks, and means to vary the length of said bail.

7. In a fastening device adapted to secure an oil pan to a block, a perch secured to said block, a tightening member rotatively mounted on said perch, a bail eccentrically mounted on said tightening member, said bail having hooks at the ends thereof, said oil pan having spaced apertures adapted to be engaged by said hooks, and means to vary the length of said bail.

8. The combination of an internal combustion engine block and a removable oil pan, said block having a groove in its lower face and having a bevelled portion adjacent said groove and said pan having a bead portion fitting said groove and having an inclined resilient portion fitting said bevelled portion and means to hold said pan on said block.

9. The combination of an internal combustion engine block member and a removable oil pan member, releasable connecting means for holding said members assembled, said connecting means including a tightening member mounted on one of said first mentioned members, a connecting member on said tightening member and co-acting means between the connecting member and the other of said first mentioned members to hold said first two members assembled.

LAWRENCE NITTEL.